US010858609B2

(12) United States Patent
Takata et al.

(10) Patent No.: US 10,858,609 B2
(45) Date of Patent: Dec. 8, 2020

(54) ANTICORROSIVE AGENT AND TERMINAL FITTED ELECTRIC WIRE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); KYUSHU UNIVERSITY, Fukuoka (JP); ENEOS Corporation, Tokyo (JP)

(72) Inventors: Yutaka Takata, Yokkaichi (JP); Takehiro Hosokawa, Yokkaichi (JP); Tatsuya Hase, Yokkaichi (JP); Naoyuki Oshiumi, Yokkaichi (JP); Takuya Yamashita, Yokkaichi (JP); Makoto Mizoguchi, Fukuoka (JP); Koichi Yoshida, Tokyo (JP); Kenichi Komiya, Tokyo (JP); Takashi Arai, Tokyo (JP); Yuji Shitara, Tokyo (JP); Kazuhiro Yagishita, Tokyo (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, Fukuoka (JP); ENEOS CORPORATION, Tokyo (JP)

( * ) Notice: Subject to any disclaimer, the term of this patent is extended or adjusted under 35 U.S.C. 154(b) by 0 days.

(21) Appl. No.: 16/060,136

(22) PCT Filed: Dec. 21, 2016

(86) PCT No.: PCT/JP2016/088020
§ 371 (c)(1),
(2) Date: Jun. 7, 2018

(87) PCT Pub. No.: WO2017/119289
PCT Pub. Date: Jul. 13, 2017

(65) Prior Publication Data

US 2018/0362876 A1 Dec. 20, 2018

(30) Foreign Application Priority Data

Jan. 7, 2016 (JP) ................................ 2016-001447

(51) Int. Cl.
*C10M 173/02* (2006.01)
*C07F 5/04* (2006.01)
(Continued)

(52) U.S. Cl.
CPC ........ *C10M 133/16* (2013.01); *C10M 137/06* (2013.01); *C10M 159/005* (2013.01);
(Continued)

(58) Field of Classification Search
CPC .............. C10M 133/16; C10M 137/06; C10M 159/005; C10M 2205/20; C23C 22/03;
(Continued)

(56) References Cited

U.S. PATENT DOCUMENTS 6,331,509 B1 * 12/2001 Heimann ................. C09D 5/08 508/136
2009/0176668 A1 * 7/2009 Shitara ................. C10M 169/02 508/100
(Continued)

FOREIGN PATENT DOCUMENTS

JP 2010-174340 A 8/2010
JP 2010-229535 A 10/2010
(Continued)

OTHER PUBLICATIONS

Jan. 31, 2017 International Search Report issued in Patent Application No. PCT/JP2016/088020.
(Continued)

*Primary Examiner* — Prem C Singh
*Assistant Examiner* — Francis C Campanell
(74) *Attorney, Agent, or Firm* — Oliff PLC

(57) ABSTRACT

An anticorrosive agent including: a high-consistency material having a lubricant base oil and an amide compound, a composition of a phosphorus compound comprising one or more compounds represented by the general formulae (1)
(Continued)

and (2) and a metal, and at least one kind of resin selected from a rosin-based resin, a terpene resin, a terpene phenol resin, a phenol resin, a coumarone-indene resin, and a petroleum resin, wherein a mass ratio of the high-consistency material and the composition is within a range of 50:50 to 98:2, and a content of resin is 2 to 20 parts by mass with respect to 100 parts by mass of the total of the high-consistency material and the composition.

14 Claims, 2 Drawing Sheets

(51) Int. Cl.

| | |
|---|---|
| ***C10M 169/04*** | (2006.01) |
| ***C10M 133/16*** | (2006.01) |
| ***C23C 22/03*** | (2006.01) |
| ***C10M 137/06*** | (2006.01) |
| ***C10M 159/00*** | (2006.01) |
| ***H01B 7/28*** | (2006.01) |
| *C10N 10/02* | (2006.01) |
| *C10N 10/04* | (2006.01) |
| *C10N 10/06* | (2006.01) |
| *C10N 10/08* | (2006.01) |
| *C10N 30/12* | (2006.01) |
| *C10N 40/32* | (2006.01) |

(52) U.S. Cl.
CPC ........... *C23C 22/03* (2013.01); *H01B 7/2806* (2013.01); *C10M 2205/20* (2013.01); *C10N 2010/02* (2013.01); *C10N 2010/04* (2013.01); *C10N 2010/06* (2013.01); *C10N 2010/08* (2013.01); *C10N 2030/12* (2013.01); *C10N 2040/32* (2013.01)

(58) Field of Classification Search
CPC .............. H01B 7/2806; C10N 2010/02; C10N 2010/04; C10N 2010/06; C10N 2010/08; C10N 2030/12; C10N 2040/32
USPC ......................................... 508/200, 162, 282
See application file for complete search history.

(56) References Cited

U.S. PATENT DOCUMENTS

| | | | | |
|---|---|---|---|---|
| 2010/0022425 | A1 | 1/2010 | Michel et al. | |
| 2010/0256027 | A1 | 10/2010 | Miyamoto et al. | |
| 2017/0062954 | A1 * | 3/2017 | Hase .................... | C10M 137/06 |
| 2017/0117650 | A1 | 4/2017 | Yoshida et al. | |

FOREIGN PATENT DOCUMENTS

| | | | |
|---|---|---|---|
| JP | 4811408 | B2 | 11/2011 |
| JP | 2012-041563 | A | 3/2012 |
| JP | 5729855 | B2 | 6/2015 |
| WO | 2009/022629 | A1 | 2/2009 |
| WO | 2015/125577 | A1 | 8/2015 |
| WO | 2015/146985 | A1 | 10/2015 |

OTHER PUBLICATIONS

Sep. 25, 2019 Office Action issued in Chinese Patent Application No. 201680076625.1.

Jun. 8, 2020 Office Action issued Chinese Patent Application No. 201680076625.3.

* cited by examiner

ANTICORROSIVE AGENT AND TERMINAL FITTED ELECTRIC WIRE

TECHNICAL FIELD

The present invention relates to an anticorrosive agent and a terminal fitted electric wire.

BACKGROUND ART

In metal equipment and metal parts, grease is used for the purpose of lubrication and corrosion resistance. For example, Patent Literature 1 describes the use of grease containing a perfluoroether base oil, a consistency improver, barium sulfate, or antimony oxide to machinery parts. Patent Literature 2 suggests the use of a surface treatment agent containing 30 to 95 mass % of a volatile liquid having a boiling point of 300° C. or lower, 1 to 50 mass % of a lubricant oil and/or an anticorrosive agent, and 0.1 to 50 mass % of a compound containing an amide group.

CITATION LIST

Patent Literature

PTL1: JP 4811408 B
PTL2: WO 2009/022629 A

SUMMARY OF INVENTION

Problems to be Solved by the Invention

The grease disclosed in Patent Literature 1 shows poor adhesion to the metal. Especially, under the high temperature conditions, the grease is likely to cause leakage from the metal surface, and thus difficulty arises in protecting the metal surface stably. This is presumably because that the grease of Patent Literature 1 does not chemically bond with the metal surface, but it merely adheres to the metal surface through the Van der Waals force, which is lower in absorption. The surface treatment agent in Patent Literature 2 also shows poor adhesion to a metal. Especially, under high temperature conditions, the surface treatment agent is likely to leak from the metal surface, and thus is hard to protect the metal surface stably. When adhesion of a material to the metal is poor, the possibility arises that the material is peeled from the metal surface at the coated portion when the metal is placed in heating-cooling environments due to expansion or shrinkage of the material. Thus, an anticorrosion property of the material may not be maintained.

It is an object of the present invention to provide an anticorrosive agent stably protecting a metal surface even at a high temperature and maintaining adhesion to the metal surface even in heating-cooling environments with maintaining an anticorrosion property, and a terminal-fitted electric wire improved in anticorrosion property by using the agent.

Solution to Problem

In order to solve the foregoing problem, the anticorrosive agent according to the present invention contains a high-consistency material (A) containing a lubricant base oil and an amide compound, a composition (B) of a phosphorus compound containing one or more compounds represented by the general formulae (1) and (2) and a metal, and a tackifier (C), wherein a mass ratio (A):(B) of the high-consistency material (A) and the composition (B) is within a range of 50:50 to 98:2, and a content of the tackifier (C) is 2 to 20 parts by mass with respect to 100 parts by mass of the total of the high-consistency material (A) and the composition (B):

[Chem. 1]

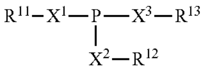

(1)

[Chem. 2]

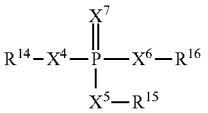

(2)

where $X^1$ to $X^7$ each represent independently an oxygen atom or a sulfur atom, $R^{11}$ to $R^{13}$ each represent independently a hydrogen atom or a hydrocarbon group having 1 to 30 carbon atoms, among which at least one is a hydrocarbon group having 1 to 30 carbon atoms, and $R^{14}$ to $R^{16}$ each represent independently a hydrogen atom or a hydrocarbon group having 1 to 30 carbon atom among which at least one is a hydrocarbon group having 1 to 30 carbon atoms.

The anticorrosive agent according to the present invention preferably has a softening point in the range of 100° C. to 150° C.

The amide compound preferably contains one or more compounds represented by the following general formulae (3) to (5):

[Chem. 3]

$$R^{21}—CO—NH—R^{22} \quad (3)$$

[Chem. 4]

$$R^{23}—CO—NH—Y^{31}—NH—CO—R^{24} \quad (4)$$

[Chem. 5]

$$R^{25}—NH—CO—Y^{32}CO—O—NH—R^{26} \quad (5)$$

where $R^{21}$ to $R^{26}$ each represent independently a saturated or unsaturated linear hydrocarbon group having 5 to 25 carbon atoms, $R^{22}$ may be hydrogen, and $Y^{31}$ and $Y^{32}$ represent a divalent hydrocarbon group having 1 to 10 carbon atoms selected from an alkylene group and a phenylene group having 1 to 10 carbon atoms, or an alkylphenylene group having 7 to 10 carbon atoms.

The amide compound is preferably a fatty acid amide having a melting point within a range of 20° C. to 200° C.

The phosphorus compound preferably has one or more branched linear structures or one or more carbon-carbon double bond structures in the structure of the hydrocarbon groups.

The metal forming the composition together with the phosphorus compound is preferably at least one selected from alkali metals, alkaline earth metals, aluminum, titanium, and zinc.

The composition of the phosphorus compound and the metal preferably has a molecular weight of 3000 or lower.

The tackifier (C) is preferably at least one kind of resin selected from a rosin-based resin, a terpene resin, a terpene phenol resin, a phenol resin, a coumarone-indene resin, and a petroleum resin.

The terminal-fitted electric wire according to the present invention is a wire in which an electric connection part between a terminal and an electric conductor is covered with the anticorrosive agent.

Advantageous Effects of Invention

The anticorrosive agent according to the present invention contains the high-consistency material (A) containing the lubricating base oil and the amide compound, the composition (B) of the phosphorus compound containing one or more compounds represented by the above general formulae (1) and (2) and the metal, and the tackifier (C). Further, the mass ratio (A):(B) is within a range of 50:50 to 98:2, and the content of (C) is 2 to 20 parts by mass with respect to 100 parts by mass of the total of (A) and (B). Having this composition, the anticorrosive agent stably protects a metal surface even at a high temperature and maintains adhesion to the metal surface even in heating-cooling environments with maintaining an anticorrosion property.

The anticorrosive agent according to the present invention has a softening point in the range of 100° C. to 150° C., whereby deterioration of the material when heated for application on the metal surface is suppressed. Further, the anticorrosive agent stably protects the metal surface even at a high temperature with sufficiently maintaining an anticorrosion property.

In the anticorrosive agent according to the present invention, the phosphorus compound has one or more branched linear structures or one or more carbon-carbon double bond structures in the structure of the hydrocarbon group, which contributes to improvement in compatibility with the lubricant base oil.

Further, when the metal forming the composition together with the phosphorus compound is at least one member selected from alkali metals, alkaline earth metals, aluminum, titanium, and zinc, the adhesion of the anticorrosive agent when applied to a metal surface is improved.

When the composition of the phosphorus compound and the metal has a molecular weight of 3000 or lower, the compatibility with the lubricant base oil is improved.

When the tackifier (C) is at least one kind of resin selected from a rosin-based resin, a terpene resin, a terpene phenol resin, a phenol resin, a coumarone-indene resin, and a petroleum resin, the adhesion of the anticorrosive agent to the metal surface is maintained even in heating-cooling environments while maintaining the anticorrosion property.

Then, in the terminal-fitted electric wire according to the present invention, an electric connection part between a terminal and a wire conductor is covered with the anticorrosive agent. Therefore, a metal surface such as of the terminal and the wire conductor is stably protected even at a high temperature and adhesion to the metal surface is also maintained even in heating-cooling environments with an anticorrosion property of the terminal-fitted electric wire maintained.

DESCRIPTION OF EMBODIMENTS

Figure 1:
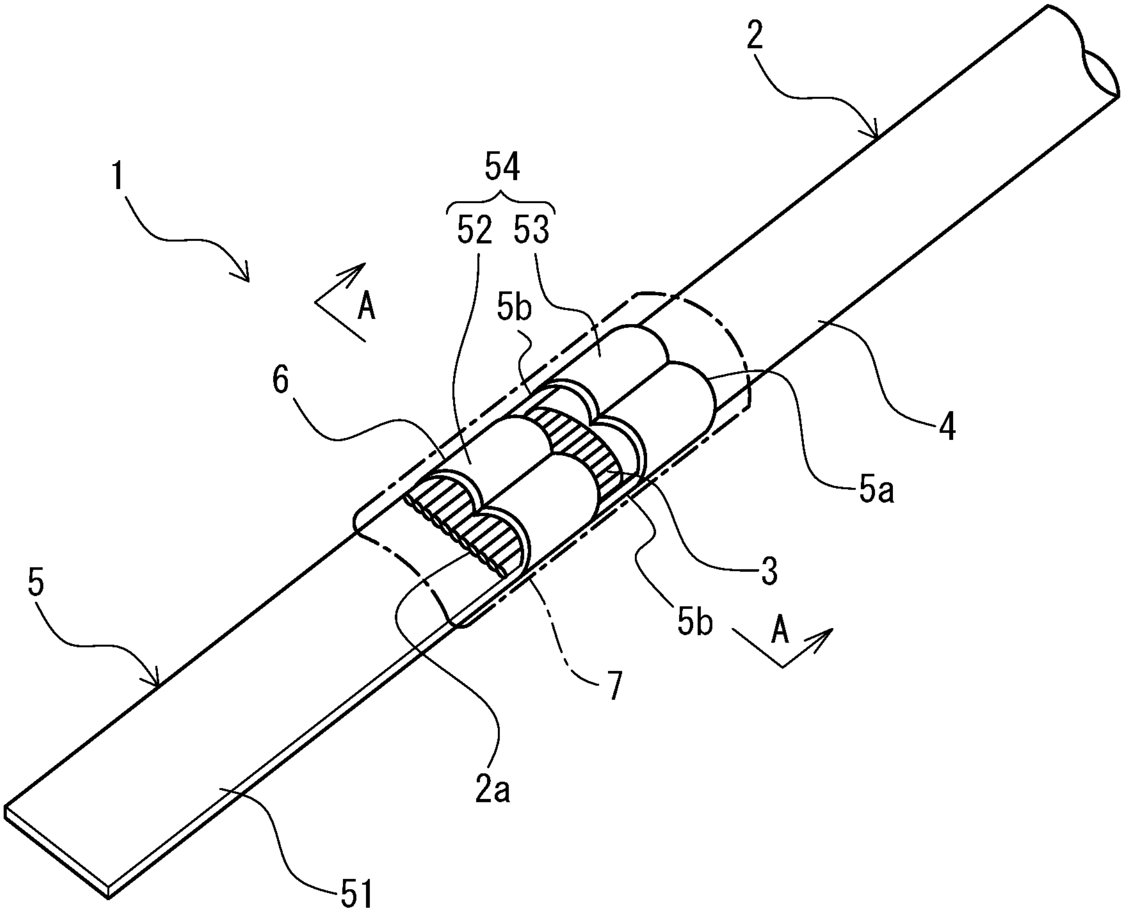
FIG. 1 is a perspective view of a terminal-fitted electric wire according to a preferred embodiment of the present invention.

Next, a preferred embodiment of the present invention is to be described specifically.

The anticorrosive agent according to the present invention (hereinafter sometimes referred to as the present anticorrosive agent) contains a high-consistency material (A) containing a lubricant base oil and an amide compound, a composition (B) of a specific phosphorus compound and a metal, and a tackifier (C).

The lubricant base oil usable herein includes one of an arbitrary mineral oil, a wax isomerized oil, and a synthetic oil or a mixture of two or more of them used as usual lubricant base oils. The mineral oil usable herein are specifically paraffinic and naphthenic oils, and n-paraffin, which are purified from lubricant fractions contained by distillation under ordinary pressure or distillation under reduced pressure of crude oils by appropriately combining purification treatments such as solvent deasphaltation, solvent extraction, hydrocracking, solvent dewaxing, catalytic dewaxing, hydrorefining, sulfuric acid cleaning, and white clay treatment of a lubricant oil fractions.

The wax isomerized oils usable herein include those prepared through a hydrogen isomerization treatment of a wax raw material, such as natural wax, e.g., petroleum slack wax obtained through solvent dewaxing of a hydrocarbon oil, or a synthetic wax formed by the so-called Fischer Tropsch synthetic process, in which a mixture of carbon monoxide and hydrogen is brought in contact with a suitable synthetic catalyst at a high temperature and a high pressure. In a case of using the slack wax as the wax raw material, since the slack wax contains large amounts of sulfur and nitrogen, which are unnecessary in the lubricant base oil, it is desirable that the slack wax is hydrogenated as needed to prepare and use the wax having been reduced in the sulfur content and the nitrogen content, which is thus used as a raw material.

The synthetic oil is not particularly limited, and includes, for example, a poly-α-olefin, such as a 1-octene oligomer, 1-decene oligomer, and ethylene-propylene oligomer or a hydrogenated product thereof, isobutene oligomer and hydrogenated products thereof, isoparaffin, alkylbenzene, alkylnaphthalene, diester (for example, ditridecyl glutarate, di-2-ethylhexyl adipate, diisodecyl adipate, ditridecyl adipate, and di-2-ethylhexylsebacate), polyolester (for example, trimethylolpropane caprylate, trimethylolpropane pelargonate, pentaerythritol-2-ethylhexanoate, and pentaerythritol pelargonate), polyoxyalkylene glycol, dialkyl diphenyl ether, polyphenyl ether, etc.

The kinematic viscosity of the lubricant base oil is not particularly limited. Usually, it is preferably from 1 to 150 $mm^2/s$ at 100° C. The kinematic viscosity at 100° C. is more preferably within a range of 2 to 130 $mm^2/s$ because the volatility and the handleability in production are excellent. The kinematic viscosity is measured according to JIS K 2283.

The amide compound forms a network structure by hydrogen bonds in the lubricant base oil. This provides the lubricant base oil with the consistency to form a grease-like high-consistency material. That is, when it is used together with the lubricant base oil, a gel-like product is formed at a normal temperature. That is, amide compound gels (semi-solidifies) the liquid lubricant base oil at a normal temperature. The high-consistency material is maintained due to its consistency on the coat surface of the material to be coated at a normal or heat temperature.

The amide compound is a compound having one or more amide groups (—NH—CO—), and a mono-amide compound having one amide group or a bis-amide compound having two amide groups can be used preferably.

Compounds, for example, represented by the following general formulae (3) to (5) can be used as the amide compound. They may be used alone or two or more of them may be used in combination.

[Chem. 3]

$$R^{21}—CO—NH—R^{22} \quad (3)$$

[Chem. 4]

$$R^{23}—CO—NH—Y^{31}—NH—CO—R^{24} \quad (4)$$

[Chem. 5]

$$R^{25}—NH—CO—Y^{32}CO—O—NH—R^{26} \quad (5)$$

In the general formulae (3) to (5), $R^{21}$ to $R^{26}$ each represent independently a saturated or unsaturated linear hydrocarbon group having 5 to 25 carbon atoms, provided that $R^{22}$ may be hydrogen; and $Y^{31}$ and $Y^{32}$ each represent a divalent hydrocarbon group having 1 to 10 carbon atoms selected from an alkylene group or a phenylene group having 1 to 10 carbon atoms, and an alkylphenylene group having 7 to 10 carbon atoms. Further, in the general formulae (3) to (5), hydrogen of the hydrocarbon group constituting $R^{21}$ to $R^{26}$ may be partially substituted by a hydroxyl group (—OH).

The amide compound represented by the general formula (3) includes, specifically, a saturated fatty acid amide such as lauric acid amide, palmitic acid amide, stearic acid amide, behenic acid amide, and hydroxystearic acid amide, an unsaturated fatty acid amide such as oleic acid amide and erucic acid amide, and a substituted amide of a saturated or unsaturated long-chain fatty acid and a long-chain amine such as stearylstearic acid amide, oleyloleic acid amide, oleylstearic acid amide, and stearyloleic acid amide. Among them, an amide compound in which at least one of $R^{21}$ to $R^{22}$ in the general formula (3) is a saturated linear hydrocarbon group having 12 to 20 carbon atoms, for example, an amide compound in which $R^{21}$ is a saturated linear hydrocarbon group having 12 to 20 carbon atoms and $R^{22}$ is a hydrogen atom in the general formula (3), or an amide compound in which each of $R^{21}$ and $R^{22}$ in the general formula (3) is saturated linear hydrocarbon group having 12 to 20 carbon atoms is preferred. More specifically, stearylstearic acid amide is preferred.

The amide compound represented by the general formula (4) includes, specifically, ethylene bisstearic acid amide, ethylene bisisostearic acid amide, ethylene bisoleic acid amide, methylene bislauric acid amide, hexamethylene bisoleic acid amide, hexamethylene bishydroxystearic acid amide, and m-xylylene bisstearic acid amide. Among them, an amide compound in which at least one of $R^{23}$ and $R^{24}$ in the general formula (4) is a saturated linear hydrocarbon group having 12 to 20 carbon atoms, for example, an amide compound in which $R^{23}$ is a saturated linear hydrocarbon group having 12 to 20 carbon atoms and $R^{24}$ is a hydrogen atom in the general formula (4), or an amide compound in which each of $R^{23}$ and $R^{24}$ is a saturated linear hydrocarbon group having 12 to 20 carbon atoms in the general formula (4) is preferred. More specifically, ethylene bisisostearic acid amide is preferred.

The amide compound represented by the general formula (5) includes specifically, for example, N,N'-distearyl sebacic acid amide. Among them, an amide compound in which at least one of $R^{25}$ and $R^{26}$ in the general formula (5) is a saturated linear hydrocarbon group having 12 to 20 carbon atoms, for example, an amide compound in which $R^{25}$ is a saturated linear hydrocarbon group having 12 to 20 carbon atoms and $R^{26}$ is a hydrogen atom in the general formula (5) or an amide compound in which each of $R^{25}$ and $R^{26}$ in the general formula (5) is a saturated linear hydrocarbon group having 12 to 20 carbon atoms is preferred.

From a viewpoint of tending to keep a gel state (semi-solid state) at a normal temperature when mixed with a lubricant base oil or tending to keep a gel-state (semi-solid state), the amide compound preferably has a melting point of 20° C. or higher. It is more preferably 50° C. or higher, even more preferably 80° C. or higher, and particularly preferably 120° C. or higher. Further, the melting point is preferably 200° C. or lower, more preferably 180° C. or lower, even more preferably 150° C. or lower. Further, the molecular weight of the amide compound is preferably within a range of 100 to 1000, and more preferably within a range of 150 to 800.

From a viewpoint of tending to keep the gel-state (semi-solid state) at a normal temperature when mixed with the lubricant base oil and tending to keep a gel state (semi-solid state) at a normal temperature, the content of the amide compound is preferably 1 mass part or more with respect to 100 mass parts of the lubricant base oil. It is more preferably 2 mass parts or more, and even more preferably 5 mass parts or more. Further, it is preferably 70 mass parts or less, more preferably 60 mass parts or less, and even more preferably 50 mass parts or less with respect to 100 mass parts of the lubricant base oil. Preferably, it is 60 mass parts or less, and more preferably 50 mass parts or less.

A specific phosphorus compound contains one or more compounds represented by the following general formulae (1) and (2):

[Chem. 6]

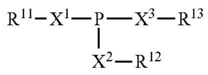

(1)

[Chem. 7]

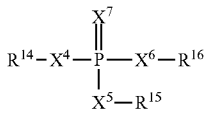

(2)

where $X^1$ to $X^7$ each represent independently an oxygen atom or a sulfur atom, $R^{11}$ to $R^{13}$ each represent independently a hydrogen atom or a hydrocarbon group having 1 to 30 carbon atoms and at least one of them is a hydrocarbon group having 1 to 30 of carbon atoms, $R^{14}$ to $R^{16}$ each represent independently a hydrogen atom or a hydrocarbon group having 1 to 30 carbon atom and at least one of them is a hydrocarbon group having 1 to 30 carbon atoms.

The hydrocarbon group includes, for example, alkyl group, cycloalkyl group, alkyl-substituted cycloalkyl group, alkenyl group, aryl group, alkyl-substituted aryl group, and aryl alkyl group.

The alkyl group includes, for example, methyl group, ethyl group, propyl group, butyl group, pentyal group, hexyl group, heptyl group, octyl group, nonyl group, decyl group, undecyl group, dodecyl group, tridecyl group, tetradecyl group, pentadecyl group, hexadecyl group, heptadecyl group, and octadecyl group. They may be either linear or branched.

The cycloalkyl group includes, for example, cyclopentyl group, cyclohexyl group, and cycloheptyl group. The alkyl-substituted cycloalkyl group includes, for example, methylcyclopentyl group, dimethylcyclopentyl group, methylethylcyclopentyl group, diethylcyclopentyl group, methylcyclohexyl group, diethylcyclohexyl group, methylethylcyclohexyl group, diethylcyclohexyl group, methylcycloheptyl group, dimethylcycloheptyl group, methylethylcyclopeptyl group, and diethylcycloheptyl group. The substitution position of the alkyl-substituted cycloalkyl group is not particularly restricted. The alkyl group may be linear or branched.

The alkenyl group includes, for example, butenyl group, pentenyl group, hexenyl group, heptenyl group, octenyl group, nonenyl group, decenyl group, undecenyl group, dodecenyl group, tridecenyl group, tetradecenyl group, pentadecenyl group, hexadecenyl group, heptadecenyl group, and octadecenyl group. They may be either linear or branched.

The aryl group includes, for example, phenyl group, and naphthyl group. Alkyl-substituted aryl group includes, for example, tolyl group, xylyl group, ethylphenyl group, propylphenyl group, butylphenyl group, pentylphenyl group, hexylphenyl group, heptylphenyl group, octylphenyl group, nonylphenyl group, decylphenyl group, undecylphenyl group and dodecylphenyl group. The substitution position of the alkyl substituted aryl group is not particularly restricted. The alkyl group may be linear or branched. The arylalkyl group includes, for example, benzyl group, phenylethyl group, phenylpropyl group, phenylbutyl group, phenylpengyl group, and phenylhexyl group. The alkyl group may be linear or branched.

All of $X^1$ to $X^7$ are preferably oxygen atoms. The hydrocarbon group of $R^{11}$ to $R^{16}$ having 1 to 30 carbon atoms are preferably hydrocarbon groups having 4 to 30 carbon atoms, and more preferably hydrocarbon groups having 8 to 30 carbon atoms.

Preferably, all of $X^1$ to $X^7$ are oxygen atoms. Preferably, at least one of $R^{11}$ to $R^{13}$ is a hydrogen atom and at least one of them is a hydrocarbon group having 1 to 30 carbon atoms. Preferably, at least one of $R^{14}$ to $R^{16}$ is a hydrogen atom and at least one of them is a hydrocarbon group having 1 to 30 carbon atoms.

The phosphorus compound represented by the general formula (1) includes, for example, phosphorous acid, monothiophosphorous acid, dithiophosphorous acid, phosphite monoester, monothiophosphite monoester, dithiophosphite monoester, phosphite diester, monothiophosphite diester, dithiophosphite diester, phosphite triester, monothiophosphite triester, and dithiophosphite triester. They may be used alone or two or more of them may be used in combination as the phosphorus compounds represented by the general formula (1).

The phosphorus compound represented by the general formula (2) includes, for example, phosphoric acid, monothiophosphoric acid, dithiophosphoric acid, phosphate monoester, monothiophosphate monoester, dithiophosphate monoester, phosphate diester, monothiophosphate diester, dithiophosphate diester, phosphate triester, monothiophosphate triester, and dithiophosphate triester. They may be used alone or two or more of them may be used in combination as the phosphorus compound represented by the general formula (2).

For the phosphorus compound, from a viewpoint of the following compatibility improving effect, stickiness improving effect, adhesion improving effect, etc., the phosphorus compound represented by the general formula (2) is more preferred. Further, among the phosphorus compounds represented by the general formula (2), acidic phosphate ester represented by the following general formula (6) or general formula (7) is particularly preferred.

(Chem. 8)

$$P(=O)(-OR^{14})(-OH)_2 \quad (6)$$

(Chem. 9)

$$P(=O)(-OR^{14})_2(-OH) \quad (7)$$

The metal that forms the composition together with the specific phosphorus compound includes, for example, an alkali metal such as Li, Na, and K, an alkaline earth metal such as Mg and Ca, aluminum, titanium, zinc, etc. They may be used alone or two or more of them may be used in combination. The metals can provide good adsorption to the metal surface due to their relatively high ionization tendency. Further, since the ionization tendency is, for example, higher than that of Sn, it can be excellent in the ion bondability to Sn. Among them, Ca and Mg are more preferred from a viewpoint for example, of waterproofness. The metal forming the composition with the specific phosphorus compound preferably has a valence of two or more from a viewpoint of increase of the molecular weight of the composition and heat resistance.

The metal source for the composition containing the specific phosphorus compound and the metal includes a metal hydroxide, a metal carboxylate, etc. The carboxylic acid of the metal carboxylate includes salicylic acid, benzoic acid, phthalic acid, etc. The metal salt of the carboxylic acid is a neutral salt. The metal source may be a basic salt, or may be a hyper basic salt. Among them, hyper basic salicylic acid or the like is preferred from a viewpoint of the solubility and reactivity of metal ions during reaction.

In the composition of the specific phosphorus compound and the metal, when at least one of the hydrocarbon group of the specific phosphorus compound is a hydrocarbon group having 4 to 30 carbon atoms, the compatibility with the lubricant base oil, which is the long-chained alkyl compound, is improved. The hydrocarbon group is an organic group containing carbon and hydrogen but not containing hetero elements such as N, O, and S. Then, in view of the compatibility with the lubricant base oil which is the long-chained alkyl compound, the hydrocarbon group of the specific phosphorus compound is preferably an aliphatic hydrocarbon group or a cycloaliphatic hydrocarbon group. More preferably, it is an aliphatic hydrocarbon group.

The aliphatic hydrocarbon group includes alkyl group containing a saturated hydrocarbon and, an alkenyl group containing an unsaturated hydrocarbon, each of which may be used. The alkyl group or the alkenyl group as the aliphatic hydrocarbon group may be either in a linear or branched structure. However, when the alkyl group is a linear alkyl group such as an n-butyl group or n-octyl group, alkyl groups tend to be aligned to each other and increase the crystallinity of the composition of the specific phosphorus compound and the metal, lowering the solubility with the lubricant base oil. In view of the above, when the hydrocarbon group is an alkyl group, a branched alkyl group is more preferred compared to a linear alkyl group. On the other hand, since the alkenyl group has one or more carbon-carbon double bond structures, it has not so-high crystallinity even if it has a linear structure. Accordingly, the alkenyl group may either be linear or branched.

When the number of carbon atoms of at least one hydrocarbon group is less than 4, the specific phosphorus compound becomes inorganic. Further, the specific phosphorus compound tends to increase the crystallinity. Then, it shows poor solubility with the lubricant base oil and is no longer miscible with the lubricant base oil. On the other hand, if the number of carbon atoms of the hydrocarbon group is more than 30, the specific phosphorus compound shows excessively high viscosity and tends to lower the fluidity. The number of carbon atoms of the hydrocarbon group is preferably 5 or more and, more preferably, 6 or more in view of the compatibility with the lubricant base oil. Further, the number of carbon atoms of the hydrocarbon group is preferably 26 or less and, more preferably, 22 or less from a viewpoint of fluidity, etc.

Further, the composition of the specific phosphorus compound and the metal has a phosphate group (polar group) and a non-polar group (hydrocarbon group in the ester portion) together in the molecule, and can be present in a layered state in which polar groups are associated to each other and non-polar groups are associated to each other and, accordingly, the composition can be a highly viscous liquid even in a non-polymerized state. If it is a viscous liquid, the composition can be adhered more intensely to the metal surface by utilizing the physical adsorption due to Van der Waals force. It is considered that the viscosity is obtained by the entanglement caused between linear molecular chains to each other. In view of the above, it is preferred not to promote crystallization of the specific phosphorus compound. Specifically, for this purpose, hydrocarbon group has a number of hydrocarbon from 4 to 30, has one or more branched chain structures or one or more carbon-carbon double bond structures, etc.

From a viewpoint of the adhesion, it is necessary that the specific phosphorus compound forms a composition together with the metal. When the specific phosphorus compound itself which is not composited with the metal is used, the polarity of the phosphate group portion is small, the association (cohesion property) between the polar phosphate groups is low, and a liquid of high viscosity is not formed. Accordingly, adhesion (viscosity) is low. Further, when the specific phosphorus compound is composited with ammonia or an amine, the polarity at a portion of the phosphate group is small, and the association (cohesion property) between the phosphate groups, which are polar groups, to each other is low, failing to form a liquid at high viscosity. Accordingly, the adhesion (viscosity) is low.

The hydrocarbon group includes more specifically, for example, oleyl group, stearyl group, isostearyl group, 2-ethylhexyl group, butyloctyl group, isomyristyl group, isocetyl group, hexyldecyl group, octyldecyl group, octyldodecyl group, and isobehenyl group.

Then, the specific acidphosphate ester includes, for example, butyloctyl acid phosphate, isomyristyl acid phosphate, isocetyl acid phosphate, hexyldecyl acid phosphate, isostearyl acid phosphate, isobehenyl acid phosphate, octyldecyl acid phosphate, octyldodecyl acid phosphate, isobutyl acid phosphate, 2-ethylhexyl acid phosphate, isodecylacidphosphate, laurylacidphosphate, tridecyl acid phosphate, stearyl acid phosphate, oleyl acid phosphate, myristyl acid phosphate, palmityl acid phosphate, di-butyloctyl acid phosphate, di-isomyristyl acid phosphate, di-isocetyl acid phosphate, di-hexyldecyl acid phosphate, di-isostearyl acid phosphate, di-isobehenyl acid phosphate, di-octyldecyl acid phosphate, di-octyldodecyl acid phosphate, di-isobutyl acid phosphate, di-2-ethylhexyl acid phosphate, di-isodecyl acid phosphate, di-tridecyl acid phosphate, di-oleyl acid phosphate, di-myristyl acid phosphate, di-palmityl acid phosphate, etc. Among them, from a viewpoint, for example, of non-crystallinity and molecular chain entanglement with the lubricant base oil, oleyl acid phosphate and isostearyl acid phosphate are preferred.

The molecular weight of the composition of the specific phosphorus compound and the metal is preferably 3,000 or lower because the compatibility with the high-consistency material is improved by fine dispersion. It is more preferably 2,500 or lower. Further, it is preferably 80 or higher, and more preferably 100 or higher from a viewpoint, for example, of separation restriction due to increased concentration of the polar group. The molecular weight can be obtained by calculation.

The tackifier (C) is a chemical agent generally used to improve adhesion of a compound such as a unvulcanized rubber. Examples of the tackifier (C) include a rosin-based resin, a terpene resin, a terpene phenol resin, a phenol resin, a coumarone-indene resin, and a petroleum resin. They may be used alone or two or more of them may be used in combination as the tackifier (C). Among them, the rosin-based resin and the terpene phenol resin are more preferred from a viewpoint for example, of compatibility and melting point.

To the present anticorrosive agent, an organic solvent, a stabilizer, a corrosion inhibitor, a dye, a viscosity improver, a filler, etc. can be added in addition to the high-consistency material (A), the composition (B), and the tackifier (C) as long as the function of the present anticorrosive agent is not deteriorated.

In the present anticorrosive agent, the mass ratio (A):(B) of the high-consistency material (A) and the composition (B) is within a range of 50:50 to 98:2. Thus, the present anticorrosive agent is excellent in adhesion to a metal, refrains from leaking from a metal surface under the high temperature conditions, and stably protects the metal surface. Further, the anticorrosive agent forms a film having a thickness to exhibit an excellent anticorrosion property. The content of the tackifier (C) is 2 to 20 parts by mass with respect to 100 parts by mass of the total of the high-consistency material (A) and the composition (B). Having this composition, the anticorrosive agent stably protects a metal surface even at a high temperature and maintains adhesion to the metal surface even in heating-cooling environments with maintaining an anticorrosion property.

In the present anticorrosive agent, the mass ratio (A):(B) of the high-consistency material (A) and the composition (B) is preferably within a range of 60:40 to 95:5 and more preferably within a range of 70:30 to 90:10 from the viewpoint of having a film thickness and an adhesion to a metal. The content of the tackifier (C) in the present anticorrosive agent is preferably 3.0 to 15 parts by mass, and more preferably 4.0 to 10 parts by mass with respect to 100 parts by mass of the total of (A) and (B), from the viewpoint of maintaining of an anticorrosion property at a high temperature and maintaining adhesion to the metal surface even in heating-cooling environments.

The softening point of the present anticorrosive agent is preferably 150° C. or lower, which suppress the materials from being deteriorated due to heat during application. From this viewpoint, the softening point is more preferably 140°

C. or lower, furthermore preferably 130° C. or lower. On the other hand, from the viewpoint of maintaining an anticorrosion property, the softening point of the present anticorrosive agent is preferably 100° C. or higher, more preferably 110° C. or higher, further more preferably 120° C. or higher. The softening point of the present anticorrosive agent may be adjusted depending on the types (melting points) in the amide compound of the high-consistency material (A), the content of the high-consistency material (A), the content of the amide compound, etc.

The present anticorrosive agent may be obtained by mixing of the high-consistency material (A), the composition (B), the tackifier (C), and components to be added if needed. Further, the present anticorrosive agent may also be obtained by mixing of the lubricant base oil, the amide compound, the composition (B), the tackifier (C), and components to be added if needed. After coating of a surface with the anticorrosive agent, a high-consistency film is sustained on the coating surface due to the consistency of the high-consistency material. If an amide compound having a higher melting point is used, the consistency may be maintained at a high temperature, which is high but lower than the melting point, in the same way at room temperature, leading to sustainment of the high-consistency film on the coating surface at the high temperature. The composition of the specific phosphorous compound and the metal works as a metal absorption component and contributes to improvement of adhesion of the high-consistency film with the metal surface. Thus, the anticorrosive agent stably protects the metal surface even at a high temperature due to components (A) and (B). The tackifier (C) contributes to maintaining of the anticorrosion property of the present anticorrosive agent at a high temperature. Further, the tackifier (C) contributes to maintaining of the anticorrosion property of the present anticorrosive agent with maintaining adhesion to the metal surface even under heating-cooling environments. The present anticorrosive agent may be applied on the surface of a coating material by spreading the present anticorrosive agent on the surface of a material to be coated or immersing a coating material into the present anticorrosive agent.

The thickness of the high-consistency film coated on the surface of the material to be coated is preferably 100 m or smaller from a viewpoint of preventing outward flow or preventing leakage from the coated portion. It is more preferably 50 m or smaller. On the other hand, it is preferably at a predetermined thickness or larger from a viewpoint, for example, of mechanical strength, etc. of the high-consistency film to be coated. The lower limit of the film thickness includes, for example, 0.5 μm, 2 μm, 5 μm, etc.

The present anticorrosive agent can be used, for example, to lubrication or corrosion protection, etc. For use in the corrosion protection, it can be used, for example, as an anticorrosive agent for a terminal-fitted electric wire.

Next, a terminal-fitted electric wire according to the present invention is to be described.

A terminal-fitted electric wire according to the present invention is an electric wire in which terminal is connected to the conductor end of the insulation electric wire, and the electric connection portion between the terminal and the electric wire conductor is covered with a high-consistency film including a high-consistency material containing a lubricant base oil and an amide compound, a composition of a specific phosphorus compound and a metal, and a tackifier of the present anticorrosive agent. Thus, corrosion at the electric connection portion is prevented.

Figure 2:
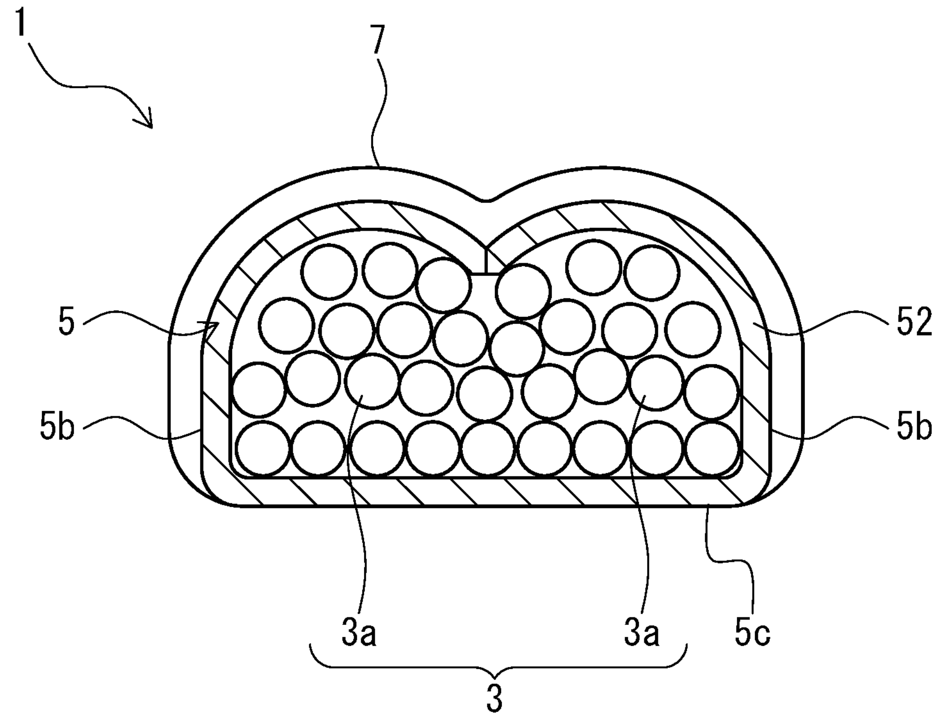
FIG. 2 is a longitudinal cross sectional view along line A-A in FIG. 1.

FIG. 1 is a perspective view of a terminal-fitted electric wire according to a preferred embodiment of the present invention, and FIG. 2 is a vertical cross sectional view along line A-A in FIG. 1. As illustrated in FIG. 1 and FIG. 2, in a terminal-fitted electric wire 1, an electric wire conductor 3 of a covered electric wire 2 covered with an insulation covering (insulator) 4 and a terminal 5 are electrically connected by an electric connection portion 6.

The terminal 5 has a tab-shaped connection part 51 formed by an elongate flat plate to be connected with a mating terminal, and an electric wire fixing portion 54 containing a wire barrel 52 and an insulation barrel 53 formed at the extended end of the connection portion 51. The terminal 5 can be formed (fabricated) to a predetermined shape by pressing a plate material made of a metal.

In the electric connection portion 6, the insulation covering 4 at the end of the covered electric wire 2 is stripped to expose the electric wire conductor 3, and the exposed electric wire conductor 3 is press-bonded to one side of the terminal 5 to connect the covered electric wire 2 with the terminal 5. The wire barrel 52 of the terminal 5 is crimped over the electric wire conductor 3 of the covered electric wire 2 to electrically connect the electric wire conductor 3 with the terminal 5. Further, the insulation barrel 53 of the terminal 5 is crimped over the insulation covering 4 of the covered electric wire 2.

In the terminal-fitted electric wire 1, a range surrounded by a dotted chain is covered with a high-consistency film 7 obtained from the present anticorrosive agent. Specifically, a range from the surface portion of the terminal 5 ahead of the top end of the electric wire conductor 3 partially exposed from the insulation covering 4 to the surface portion of the insulation covering 4 behind the backward end of the electric wire conductor 3 partially exposed from the insulation covering 4 is covered with the high-consistency film 7. That is, on the side of the top end 2*a* of the covered electric wire 2, the terminal-fitted electric wire 1 is covered with the high-consistency film 7 in a range that protrudes slightly from the top end of the electric wire conductor 3 to the side of the connection portion 51 of the terminal 5. On the side of the top end 5*a* of the terminal 5, the terminal-fitted electric wire 1 is covered with the high-consistency film 7 in a range that protrude slightly from the end of the insulation barrel 53 to the side of the insulation covering 4 of the covered electric wire 2. Then, as shown in FIG. 2, the lateral side 5*b* of the terminal 5 is also covered with the high-consistency film 7. The back surface 5*c* of the terminal 5 may or may not be covered with the high-consistency film 7. The peripheral end of the high-consistency film 7 contains a portion in contact with the surface of the terminal 5, a portion in contact with the surface of the electric wire conductor 3, and a portion in contact with the surface of the insulation covering 4.

In this way, the electric connection portion 6 is covered with the high-consistency film 7 at a predetermined thickness along the shape of the outer periphery of the terminal 5 and the covered electric wire 2. Thus, a portion of the electric wire 2 from which the electric wire conductor 3 is exposed is completely covered with the high-consistency film 7 so as not to be exposed to the outside. Accordingly, the electric connection portion 6 is completely covered with the high-consistency film 7. Since the high-consistency film 7 has excellent adhesion to all of the electric wire conductor 3, the insulation covering 4, and the terminal 5, the high-consistency film 7 prevents intrusion of moisture, etc. from the outside to the electric wire conductor 3 and the electric connection portion 6, which may corrode the metal portion. Further, since the high-consistency film 7 is excellent in adhesion, a gap is less likely to be formed between the high-consistency film 7 and any of the electric wire conductor 3, the insulation covering 4, and the terminal 5 at the peripheral end of the high-consistency film 7 even when the electric wire is bent, for example, in the process from the production of the wire harness to the attachment to a vehicle, thereby maintaining the waterproofness and corrosion protection function.

The present composition forming the high-consistency film 7 is coated for a predetermined range. For the coating of the present composition forming the high-consistency film 7, known methods such as dripping, coating, etc. can be used.

The high-consistency film 7 is formed at a predetermined thickness for a predetermined range. The thickness is, preferably, within a range of 0.01 to 0.1 mm. If the high-consistency film 7 is excessively thick, it is difficult to insert the terminal 5 into the connector. If the high-consistency film 7 is excessively thin, the corrosion protection function tends to be lowered.

The electric wire conductor 3 of the covered electric wire 2 is a stranded wire composed of a plurality of wires 3*a*. In this case, the stranded wire may be composed of a single type of metal wires or two or more types of metal wires. Further, the stranded wire may also be composed of organic fibers in addition to metal wires. The stranded wire composed of a single type of metal wires means that all metal wires forming the stranded wire are formed from the same metal material, while the stranded wire composed of two or more types of metal wires means that the stranded wire contains metal wires formed from different metal materials. The stranded wire may also include reinforcing wires (tension members) for reinforcing the covered electric wire 2.

The material for metal wire forming the electric wire conductor 3 includes, for example, copper, copper alloys, aluminum, aluminum alloys, or materials formed by applying various platings to the materials described above. The material for the metal wire as the reinforcing wires includes, for example, copper alloys, titanium, tungsten, stainless steel, etc. Further, the organic fibers as the reinforcing wire include, for example, KEVLAR. Metal wires forming the electric wire conductor 3 are preferably aluminum, aluminum alloys or materials formed by applying various types of plating to the materials described above from a viewpoint of reducing the weight.

The material for the insulation covering 4 includes, for example, rubber, polyolefin, PVC, thermoplastic elastomer, etc. They may be used alone or two or more of them may be used in combination. Various additives may be added properly to the material of the insulation covering 4. The additives include, for example, flame retardants, fillers, colorants, etc.

The material for the terminal 5 (material for matrix) includes various copper alloys, copper, etc. in addition to generally used brass. The surface of the terminal 5 may be applied with plating of various metals such as tin, nickel, and gold partially (for example, to contacts) or entirely.

While a terminal is press-bonded to the end of the electric wire conductor in the terminal-fitted electric wire 1 illustrated in FIG. 1, other known electric connection methods such as welding may also be used instead of the press-bonding connection.

Example

The present invention is to be described by way of examples but the present invention is not restricted to the examples.

(Preparation of High-Consistency Material)

High-consistency materials were prepared by mixing lubricant base oils and amide compounds according to blending compositions (parts by mass) shown in Tables 1 and 2.

Lubricant base oil A: Mineral type base oil (kinematic viscosity=4.0 $mm^2/s$ (100° C.)).

Lubricant base oil B: Mineral type base oil (kinematic viscosity=11.1 $mm^2/s$ (100° C.)).

Lubricant base oil C: Synthetic type base oil (kinematic viscosity=100.0 $mm^2/s$ (100° C.)).

Amide compound: Ethylene bisstearylamide "SLIPACKS E" (melting point 150° C., molecular weight 592) manufactured by Nippon Kasei Chemical Co. Ltd.

(Preparation of Composition of Phosphorus Compound and Metal)

<Preparation Example 1> OL-Ca

Into a 500 mL flask, 50 g (acid value: 0.163 mol) of oleyl acid phosphate ("Phoslex A18D" manufactured by SC Organic Chemical Co., Ltd., molecular weight: 467 (average), acid value: 183 mg KOH/g) and 50 mL of methanol were put into and stirred at room temperature to form a uniform solution. Into the solution, 6.04 g (0.0815 mol) of calcium hydroxide was added. The suspension was stirred for 24 hours at room temperature, and filtered after confirming that there was no calcium hydroxide precipitates. Then, methanol and generated water were distilled off under a reduced pressure by a rotary evaporator. Then, after adding 50 mL of toluene, the generated water was distilled off by azeotropy through vacuum distillation to obtain a clear and high-consistency aimed product.

(Preparation of Anticorrosive Agent)

Anticorrosive agents were prepared by mixing the high-consistency material, the composition of the phosphorus compound and the metal (phosphorus based composition), and a tackifier at the content ratios (mass parts) shown in tables 1 and 2 while heated at 160° C.

tackifier (terpene phenol type): terpene phenol copolymer ("YS POLYSTAR U130" manufactured by YASUHARA CHEMICAL CO., LTD.).

tackifier (rosin type): rosin modified resin ("HARIESTER-C" manufactured by Harima Chemicals Group, Inc.)

(Measurement of Softening Point)

The softening point of each anticorrosive agent was measured by DSC. The temperature of the anticorrosive agent was changed three times, e.g., raised, fallen, and then raised again in the range of 25 to 200° C. (temperature raising rate: 10° C./minute, in the air). The peak top temperature during melting of the anticorrosive agent in the second temperature raising was read and defined as the softening point (melting point).

(Observation of Appearance after Thermal Shock Test)

The anticorrosive agent heated to 160° C. to be liquefied was applied onto an electric connection part between a terminal made of copper and an aluminum conductor of a terminal-fitted electric wire to cover the electric connection part, as illustrated in FIG. 1. Then, the electric connection part was subjected to a thermal shock test, in which the connection part was left for 30 minutes at −40° C. and then left for 30 minutes at 80° C. in a cyclic manner. The cycle was repeated 200 times in the thermal shock test. Then, the applied anticorrosive agent was observed at normal temperature to find a portion where the anticorrosive agent was peeled from the surface of the terminal or the surface of the electric conductor. If peeling was found even at a single sample among 10 samples (N=10), the anticorrosive agent was evaluated as “failed” in appearance. If peeling was not found at any samples, the anticorrosive agent was evaluated as “passed” in appearance.

(Corrosion Resistance Performance Test after High-Temperature Test)

The anticorrosive agent heated to 160° C. to be liquefied was applied onto an electric connection part between a terminal made of copper and an aluminum conductor of a terminal-fitted electric wire to cover the electric connection part, as illustrated in FIG. 1. Then, the terminal-fitted electric wire was left for 168 hours in a thermostatic chamber held at 100° C. Then, a salt spray test was conducted at 35° C. (concentration of solution of salt: 50 g/L) according to JIS C0024 to evaluate generation of rust after 120 hours had passed from starting of the salt spraying. If rust was found even at a single sample among 10 samples (N=10), the anticorrosive agent was regarded as “poor” in anticorrosion property. If rust was not found at any samples, the anticorrosive agent was evaluated as “good” in anticorrosion property.

(Corrosion Resistance Performance Test after Thermal Shock Test)

Using the test samples subjected to the thermal shock test, a salt spray test was conducted at 35° C. (concentration of solution of salt: 50 g/L) according to JIS C0024 to evaluate generation of rust since 120 hours had passed from starting of the salt spraying. If rust was found through visual inspection even in a single sample among 10 samples (N=10), the anticorrosive agent was regarded as “poor” in anticorrosion property. If rust was not found through visual inspection at any samples, the anticorrosive agent was regarded as “good” in anticorrosion property.

TABLE 1

| | | Examples | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| High-consistency material | Lubricant base oil A | 68 | 68 | 68 | 68 | 68 | 56 | 34 | 69 | 38 | 68 | 68 | 68 | 68 | — |
| | Lubricant base oil B | — | — | — | — | — | — | 34 | — | — | — | — | — | — | — |
| | Lubricant base oil C | — | — | — | — | — | — | — | — | — | — | — | — | — | 56 |
| | Amide compound | 12 | 12 | 12 | 12 | 12 | 24 | 12 | 29 | 12 | 12 | 12 | 12 | 12 | 24 |
| Phosphorus compound | OL-Ca | 20 | 20 | 20 | 20 | 20 | 20 | 20 | 2 | 50 | 20 | 20 | 20 | 20 | 20 |
| Tackifier | Terpene phenol | 2 | 5 | 10 | 20 | 5 | 5 | 5 | 5 | 5 | — | — | — | — | 5 |
| | Rosin | — | — | — | — | — | — | — | — | — | 2 | 5 | 10 | 20 | — |
| Softening point | ° C. | 121 | 118 | 111 | 106 | 115 | 129 | 118 | 141 | 105 | 125 | 123 | 117 | 110 | 129 |
| Observation of appearance | after thermal test | good | good | good | good | good | good | good | good | good | good | good | good | good | good |
| Corrosion resistance performance test | after high-temperature test | good | good | good | good | good | good | good | good | good | good | good | good | good | good |
| | after thermal shock test | good | good | good | good | good | good | good | good | good | good | good | good | good | good |

TABLE 2

| | | Comparative Examples | | | | | |
|---|---|---|---|---|---|---|---|
| | | 1 | 2 | 3 | 4 | 5 | 6 |
| High-consistency material | Lubricant base oil A | 68 | 68 | 68 | 33 | 98 | 100 |
| | Lubricant base oil B | — | — | — | — | — | — |

TABLE 2-continued

| | | Comparative Examples | | | | | |
|---|---|---|---|---|---|---|---|
| | | 1 | 2 | 3 | 4 | 5 | 6 |
| | Amide compound | 12 | 12 | 12 | 12 | 1 | — |
| Phosphorus compound | OL-Ca | 20 | 20 | 20 | 55 | 1 | — |
| Tackifier | Terpene phenol | 1 | 25 | — | 5 | 5 | — |
| | Rosin | — | — | — | — | — | — |
| Softening point | ° C. | 124 | 95 | 125 | 93 | — | — |
| Observation of appearance | after thermal test | poor | poor | poor | poor | poor | poor |
| Corrosion resistance performance test | after high-temperature test | poor | poor | poor | poor | poor | poor |
| | after thermal shock test | poor | poor | poor | poor | poor | poor |

As shown in Table 2, as for comparative examples land 3, sufficient results were not obtained in appearance and anticorrosion property after thermal shock test since the tackifier was not added to the anticorrosive agent or the amount of the tackifier added to the agent was small. Hence, sufficient results were not obtained in appearance and anticorrosion property in heating-cooling environments. As for comparative example 2, although the tackifier was added to the anticorrosive agent, the amount thereof was too large, and thus the materials of the anticorrosive agent could not be sustained at a high temperature. Therefore, an anticorrosion property was not maintained at a high temperature. Further, sufficient results were not obtained in appearance and anticorrosion property after thermal test. As for comparative example 4, the amount of the high-consistency material was too small while the amount of the composition of the phosphorus compound and the metal was too large, and thus a sufficient film thickness could not be achieved. Further, a sufficient anticorrosion property was not obtained. As for comparative example 5, the amount of the high-consistency material was too large while the amount of the composition of the phosphorus compound and the metal was too small, and thus the anticorrosive agent could not be sustained on the surface at a high temperature. Hence, an anticorrosion property was not maintained at a high temperature. As for comparative example 6, the anticorrosive agent contained a lubricant base oil only, and thus the agent had no viscosity, was inferior in adhesion to a metal, could not be sustained on the surface at a high temperature and could not maintain an anticorrosion property at a high temperature.

Meanwhile, in Examples 1-14, the anticorrosive agent contained the high-consistency material, the composition of a phosphorus compound and a metal, and the trackifier in content ratios in the range specific in the present invention. Therefore, the anticorrosive agent caused no leakage or a little leakage from the metal surface even when the agent had been left at a high temperature. Hence, the anticorrosive agent maintained an anticorrosion property even at a high temperature, and thus showed satisfactory results in anticorrosion property. Further, the anticorrosive agent showed satisfactory results in appearance and anticorrosion property after thermal shock test. Hence, the anticorrosive agent was satisfactory in appearance and anticorrosion property in heating-cooling environments.

The embodiment of the present invention has been described specifically but the present invention is no way restricted to the embodiment described above but can be modified variously within a range not departing from the gist of the present invention.

The invention claimed is:

1. An anticorrosive agent comprising:

a composition (A) comprising:
a lubricant base oil; and
an amide compound;

a composition (B) comprising:
a phosphorus compound comprising one or more selected from compounds represented by the general formulae (1) and (2); and
a metal; and at least one kind of resin (C) selected from the group consisting of a rosin-based resin and a terpene phenol resin, wherein a mass ratio (A):(B) of the composition (A) and the composition (B) is within a range of 50:50 to 98:2, and a content of (C) is 2 to 20 parts by mass with respect to 100 parts by mass of the total of the composition (A) and the composition (B):

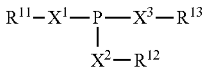

(1)

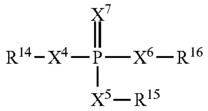

(2)

where $X^1$ to $X^7$ each represent independently an oxygen atom or a sulfur atom, $R^{11}$ to $R^{13}$ each represent independently a hydrogen atom or a hydrocarbon group having 1 to 30 carbon atoms, among which at least one is a hydrocarbon group having 1 to 30 carbon atoms, and $R^{14}$ to $R^{16}$ each represent independently a hydrogen atom or a hydrocarbon group having 1 to 30 carbon atom among which at least one is a hydrocarbon group having 1 to 30 carbon atoms, the lubricant base oil comprises one or more oil selected from the group consisting of mineral oil, a wax isomerized oil, and a synthetic oil, the amide compound comprises one or more compounds represented by the following general formulae (3) to (5):

$$R^{21}—CO—NH—R^{22} \quad (3)$$

$$R^{23}—CO—NH—Y^{31}—NH—CO—R^{24} \quad (4)$$

$$R^{25}—NH—CO—Y^{32}—CO—NH—R^{26} \quad (5)$$

where $R^{21}$ to $R^{26}$ each represent independently a saturated or unsaturated linear hydrocarbon group having 5 to 25 carbon atoms, $R^{22}$ may be hydrogen, and $Y^{31}$ and $Y^{32}$ represent a divalent hydrocarbon group having 1 to 10 carbon atoms selected from an alkylene group and a phenylene group having 1 to 10 carbon atoms, or an alkylphenylene group having 7 to 10 carbon atoms, the phosphorus compound represented by the general formulae (1) includes one or more compounds selected from the group consisting of phosphorous acid, monothiophosphorous acid, dithiophosphorous acid, phosphite monoester, monothiophosphite, monoester, dithiophosphite monoester, phosphite diester, monothiophosphite diester, dithiophosphite diester, phosphite triester, monothiophosphite triester, and dithiophosphite triester, the phosphorus compound represented by the general formulae (2) includes one or more compounds selected from the group consisting of phosphoric acid, monothiophosphoric acid, dithiophosphoric acid, phosphate monoester, monothiophosphate monoester, dithiophosphate monoester, phosphate diester, monothiophosphate diester, dithiophosphate diester, phosphate triester, monothiophosphate triester, and dithiophosphate triester, hydrocarbon groups contained in the general formulae (1) and (2) are each selected from the group consisting of alkyl group, cycloalkyl group, alkyl-substituted cycloalkyl group, alkenyl group, aryl group, alkyl-substituted aryl group, and aryl alkyl group, and the metal comprises one or more selected from the group consisting of alkali metals, alkaline earth metals, aluminum, titanium, and zinc.

2. The anticorrosive agent according to claim 1, wherein the agent has a softening point in the range of 100° C. to 150° C.

3. The anticorrosive agent according to claim 1, wherein the amide compound is a fatty acid amide having a melting point within a range of 20° C. to 200° C.

4. The anticorrosive agent according to claim 1, wherein the phosphorus compound has one or more branched linear structures or one or more carbon-carbon double bond structures in the structure of the hydrocarbon groups.

5. The anticorrosive agent according to claim 1, wherein the composition of the phosphorus compound and the metal has a molecular weight of 3000 or lower.

6. A terminal-fitted electric wire, wherein an electric connection part between a terminal and an electric conductor is covered with the anticorrosive agent according to claim 1.

7. The anticorrosive agent according to claim 2, wherein the amide compound comprises one or more compounds represented by the following general formulae (3) to (5):

[Chem. 3]

$$R^{21}—CO—NH—R^{22} \quad (3)$$

[Chem. 4]

$$R^{23}—CO—NH—Y^{31}—NH—CO—R^{24} \quad (4)$$

[Chem. 5]

$$R^{25}—NH—CO—Y^{32}CO—O—NH—R^{26} \quad (5)$$

where $R^{21}$ to $R^{26}$ each represent independently a saturated or unsaturated linear hydrocarbon group having 5 to 25 carbon atoms, $R^{22}$ may be hydrogen, and $Y^{31}$ and $Y^{32}$ represent a divalent hydrocarbon group having 1 to 10 carbon atoms selected from an alkylene group and a phenylene group having 1 to 10 carbon atoms, or an alkylphenylene group having 7 to 10 carbon atoms.

8. The anticorrosive agent according to claim 7, wherein the amide compound is a fatty acid amide having a melting point within a range of 20° C. to 200° C.

9. The anticorrosive agent according to claim 8, wherein the phosphorus compound has one or more branched linear structures or one or more carbon-carbon double bond structures in the structure of the hydrocarbon groups.

10. The anticorrosive agent according to claim 9, wherein the metal forming the composition together with the phosphorus compound is at least one selected from the group consisting of alkali metals, alkaline earth metals, aluminum, titanium, and zinc.

11. The anticorrosive agent according to claim 10, wherein the composition of the phosphorus compound and the metal has a molecular weight of 3000 or lower.

12. A terminal-fitted electric wire, wherein an electric connection part between a terminal and an electric conductor is covered with the anticorrosive agent according to claim 11.

13. The anticorrosive agent according to claim 1, wherein the content of (C) is 10 to 20 parts by mass with respect to 100 parts by mass of the total of the composition (A) and the composition (B).

14. An anticorrosive agent comprising:
- a composition (A) comprising:
  - a lubricant base oil; and
  - an amide compound;
- a composition (B) comprising:
  - a phosphorus compound comprising one or more selected from compounds represented by the general formulae (1) and (2); and
  - a metal; and
- at least one kind of resin (C) selected from the group consisting of a rosin-based resin and a terpene phenol resin,
- wherein a mass ratio (A):(B) of the composition (A) and the composition (B) is within a range of 50:50 to 98:2, and a content of (C) is 10 to 20 parts by mass with respect to 100 parts by mass of the total of the composition (A) and the composition (B):

(1)

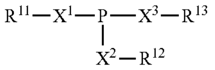

-continued (2)

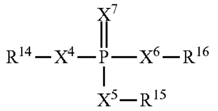

where $X^1$ to $X^7$ each represent independently an oxygen atom or a sulfur atom, $R^{11}$ to $R^{13}$ each represent independently a hydrogen atom or a hydrocarbon group having 1 to 30 carbon atoms, among which at least one is a hydrocarbon group having 1 to 30 carbon atoms, and $R^{14}$ to $R^{16}$ each represent independently a hydrogen atom or a hydrocarbon group having 1 to 30 carbon atom among which at least one is a hydrocarbon group having 1 to 30 carbon atoms, the lubricant base oil comprises one or more oil selected from the group consisting of mineral oil, a wax isomerized oil, and a synthetic oil, the amide compound comprises one or more compounds represented by the following general formulae (3) to (5):

$$R^{21}—CO—NH—R^{22} \quad (3)$$

$$R^{23}—CO—NH—Y^{31}—NH—CO—R^{24} \quad (4)$$

$$R^{25}—NH—CO—Y^{32}CO—O—NH—R^{26} \quad (5)$$

where $R^{21}$ to $R^{26}$ each represent independently a saturated or unsaturated linear hydrocarbon group having 5 to 25 carbon atoms, $R^{22}$ may be hydrogen, and $Y^{31}$ and $Y^{32}$ represent a divalent hydrocarbon group having 1 to 10 carbon atoms selected from an alkylene group and a phenylene group having 1 to 10 carbon atoms, or an alkylphenylene group having 7 to 10 carbon atoms, the phosphorus compound represented by the general formulae (1) includes one or more compounds selected from the group consisting of phosphorous acid, monothiophosphorous acid, dithiophosphorous acid, phosphite monoester, monothiophosphite, monoester, dithiophosphite monoester, phosphite diester, monothiophosphite diester, dithiophosphite diester, phosphite triester, monothiophosphite triester, and dithiophosphite triester, the phosphorus compound represented by the general formulae (2) includes one or more compounds selected from the group consisting of phosphoric acid, monothiophosphoric acid, dithiophosphoric acid, phosphate monoester, monothiophosphate monoester, dithiophosphate monoester, phosphate diester, monothiophosphate diester, dithiophosphate diester, phosphate triester, monothiophosphate triester, and dithiophosphate triester, hydrocarbon groups contained in the general formulae (1) and (2) are each selected from the group consisting of alkyl group, cycloalkyl group, alkyl-substituted cycloalkyl group, alkenyl group, aryl group, alkyl-substituted aryl group, and aryl alkyl group, and the metal comprises one or more selected from the group consisting of alkali metals, alkaline earth metals, aluminum, titanium, and zinc.

* * * * *